United States Patent [19]

Kao et al.

[11] Patent Number: 5,200,502

[45] Date of Patent: Apr. 6, 1993

[54] DEACTIVATOR REAGENT FOR OLEFIN POLYMERIZATION CATALYSTS

[75] Inventors: Sun-Chueh Kao; Frederick J. Karol, both of Belle Mead, N.J.

[73] Assignee: Union Carbide Chemicals & Plastics Technology Corporation, Danbury, Conn.

[21] Appl. No.: 935,197

[22] Filed: Aug. 26, 1992

[51] Int. Cl.$^5$ .................................................. C08F 6/02
[52] U.S. Cl. ..................................... 528/494; 528/491; 526/67; 526/69; 526/84; 526/209; 526/901
[58] Field of Search .................. 528/494, 491; 526/84, 526/67, 69, 209

[56] References Cited

U.S. PATENT DOCUMENTS

| | | | |
|---|---|---|---|
| 2,930,783 | 3/1960 | Weber et al. | 528/494 |
| 3,045,002 | 7/1962 | Sommer | 528/494 |
| 3,338,879 | 8/1967 | Kutner | 528/494 |
| 4,331,791 | 5/1982 | Rohlfing et al. | 528/494 X |
| 4,511,509 | 11/1985 | Takayuki et al. | 528/494 X |
| 4,942,147 | 7/1990 | Karol et al. | 502/113 |
| 5,037,905 | 8/1991 | Cummings et al. | 526/901 X |

FOREIGN PATENT DOCUMENTS

| | | | |
|---|---|---|---|
| 3335824 | 4/1985 | Fed. Rep. of Germany | 526/84 |
| 0176306 | 10/1984 | Japan | 526/84 |
| 1178503 | 7/1989 | Japan | 528/491 |

*Primary Examiner*—Fred Teskin
*Attorney, Agent, or Firm*—C. J. Vicari

[57] ABSTRACT

A method is disclosed for controlling the activity of or deactivating a transition element olefin polymerization catalyst by contacting the catalyst with a 1,2-diether organic compound.

22 Claims, No Drawings

DEACTIVATOR REAGENT FOR OLEFIN POLYMERIZATION CATALYSTS

TECHNICAL FIELD

The present invention relates to a method for deactivating Ziegler-Natta polymerization catalysts.

BACKGROUND OF THE INVENTION

It is of course well known that Ziegler-Natta catalysts used for olefin polymerization, can be deactivated when it is desired to either "kill" the polymerization reaction or to control the activity of the catalysts. Representative patents which disclose and claim various techniques include for example U.S. Pat. No. 4,430,488; U.S. Pat. No. 4,105,609; U.S. Pat. No. 3,876,600; U.S. Pat. No. 3,708,465; and U.S. Pat. No. 3,520,866.

More recently, U.S. Pat. No. 4,649,128 issued to Rekers et al on Mar. 10, 1987 discloses a method for controlling the activity of, or deactivating a transition element olefin polymerization catalyst by contacting the catalyst with a deactivating polymer comprising a homopolymer of an unsaturated polar organic compound or a copolymer of an alpha-olefin and an unsaturated polar organic compound.

As is known olefin polymers can be produced in a solution, slurry or gas phase polymerization system. The ability to terminate or slow down an olefin polymerization reaction using a Ziegler-Natta catalyst system is particularly desirable for a gas phase system such as a fluidized bed polymerization system. In general, the equipment for producing olefin polymers such as ethylene copolymers in a fluidized bed system include a conventional polymerization reactor, one or more heat exchangers, one or more compressors, a discharge system and piping connected to the various equipment.

Unfortunately however, during normal operations, undesirable polymer deposits tend to foul the heating exchangers, piping and equipment utilized. For example, during normal operations, the surfaces of the tubes of the heat exchanger or cooler tend to foul with undesirable polymer deposits. These deposits tend to reduce the heat exchanger capability in cooling the recycled gas which removes the heat of reaction, and also it increases the pressure drop across the heat exchanger, which adds to the load on the cycle gas compressor. Because of increasing pressure drop and/or decreased heat exchanger capability the reactor must be shut down within a short time for cleaning.

To alleviate this particular problem, it has been disclosed in U.S. Pat. No. 5,037,905 that polymer build-up in a heat exchanger during the gas phase polymerization of alpha-olefins can be inhibited by introducing para ethyl ethoxy benzoate (PEEB) upstream of the heat exchanger.

The inhibitor is generally employed in the range of about 5-20 pounds of PEEB per million pounds of polymerized alpha-olefins.

In the case of slurry or solution polymerization systems a kill reagent is also necessary to either control or terminate a run away reaction.

It has now been found that certain 1,2 diether organic compounds are eminently suitable for either completely terminating a Ziegler-Natta olefin polymerization reaction or alternatively the reaction can be slowed down if desired, moderating or eliminating the activity of the catalyst. Advantageously, this can be accomplished with very low levels of the deactivator reagents of the present invention.

SUMMARY OF THE INVENTION

Broadly contemplated the present invention provides a method for deactivating a Ziegler-Natta transition element catalyst employed in olefin polymerization reactions, which comprises contacting said catalyst with a compound represented by the formula:

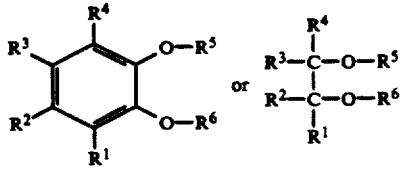

wherein $R^1$, $R^2$, $R^3$, and $R^4$ are the same or different and are H, linear or branched alkyl radicals having from 1-20 carbon atoms, cycloalkyl, aryl, arylalkyl, which with the exception of H, can combine to form rings of cyclic alkyl or benzene; $R^5$ and $R^6$ has the same meaning as $R^1$, $R^2$, $R^3$, and $R^4$ except for hydrogen, $R^5$ or $R^6$ can also combine with $R^1$, $R^2$, $R^3$, and $R^4$ to form a cyclic alkyl containing an oxygen atom, $R^5$ and $R^6$ can combine to form a divalent hydrocarbon radical containing from 1-20 carbon atoms, said compound being present in an amount sufficient to controllably deactivate said olefin polymerization catalyst.

DETAILED DESCRIPTION OF THE PRESENT INVENTION

The deactivating reagent (compound) of the present invention is effective for the deactivation of Ziegler-Natta catalysts which are employed in the polymerization of alpha-olefins. Ziegler-Natta catalysts are well known in the art and generally comprise transition metals of Groups IVB-VIII of the Periodic Table of the Elements and especially, Ti, V, Cr and Zr. In one embodiment they are employed in combination with a compound containing carbon or hydrogen linked to a metal from Groups I-III of the Periodic Table of the Elements in addition to compounds based on the non-transition elements from Group IVA of the periodic table of the elements such as silicon (e.g., $SiCl_4$) and Group IIA elements from the Periodic Table of the Elements e.g., magnesium. Catalysts of this type may be supported or unsupported, magnesium chloride comprising one of the support materials that may be employed, although other support materials may be used such as alumina, silica, zirconia and the like.

Although the present invention is applicable to solution, slurry and gas phase systems, the preferred system however for utilizing the deactivating compound is a gas phase system and most Preferably a fluidized bed reaction system which employs Ziegler-Natta catalysts for the polymerization of alpha-olefins. Various types of fluidized bed reaction systems can be utilized and representative ones are disclosed in U.S. Pat. No. 4,011,382 issued to Levine et al on Mar. 8, 1977 and U.S. Pat. No. 4,482,687. A typical system includes at least one polymerization reactor, one or more heat exchangers, one or more compressors, a discharge system and piping connected to the various equipment.

In general in the fluidized bed process the monomer stream that passes through the bed but is not reacted moves upwardly in the reactor toward what is described as a disengagement zone, or portion of the reactor that expands outwardly and upwardly resulting in a reduction of gas and particle velocity. As a result, most of the particles fall back into the bed. Unreacted monomer is taken off as a recycle gas and fed into the bottom of the reactor along with gas feed.

The catalyst is fed separately into the reactor and the rate of catalyst addition controls the polymerization rate as well as the amount of heat that is generated in the fluidized bed. The reaction can therefore be controlled by analyzing the temperature of the gas stream exiting the reactor and adjusting the rate of catalyst addition. The typical polymerization catalyst employed comprises titanium and vanadium based catalysts. Other polymerization catalysts can also be employed such as chromium or zirconium based catalysts.

The process generally runs at about 50° C. to about 105° C. and at a pressure from about 50 psi to about 500 psi.

One of the advantages of employing a gas-phase reaction process is that the Product obtained does not have to be separated from any solvent such as is required in a slurry process.

The deactivating compounds of the present invention are also eminently suitable for use in conjunction with two reactor systems such as disclosed in U.S. Pat. No. 5,037,905 issued Aug.6, 1991.

The olefins employed according to the present invention are those commonly employed for the gas phase polymerization process including the fluidized bed or stirred reactor process or the slurry polymerization process or the solution polymerization process. Merely as illustrative, the olefins employed can be copolymers of ethylene and propylene, and other alpha olefin monomer combinations such as propylene-butene, propylene-hexene, ethylene butene, ethylene hexene and also terpolymer systems produced from three or more olefinic monomers including nonconjugated dienes such as 5-ethylidene-2-norbornene.

The deactivating compounds of the present invention are generally classified as 1,2 diether organic compounds and can be represented by the following generic formula:

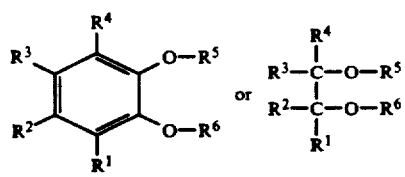

wherein $R^1$, $R^2$, $R^3$, and $R^4$ are the same or different and are H, linear or branched alkyl radicals having from 1-20 carbon atoms, cycloalkyl, aryl, arylalkyl, which with the exception of H, can combine to form rings of cyclic alkyl or benzene; $R^5$ and $R^6$ has the same meaning as $R^1$, $R^2$, $R^3$, and $R^4$ except for hydrogen, $R^5$ or $R^6$ can also combine with $R^1$, $R^2$, $R^3$, and $R^4$ to form a cyclic alkyl containing an oxygen atom, $R^5$ and $R^6$ can combine to form a divalent hydrocarbon radical containing from 1-20 carbon atoms.

The preferred deactivation compounds are those wherein $R^1$, $R^2$, $R^3$, and $R^4$ is H, an alkyl group having 1-6 carbon atoms, cycloalkyl having 3 to 6 carbon atoms, aryl having 6 to 14 carbon atoms;

$R^5$ and $R^6$ can have the same meaning as $R^1$, $R^2$, $R^3$, and $R^4$ except for H.

Compounds contemplated by the above structural formula include the following:
1,2-dimethoxybenzene, 1,2-diethoxybenzene,
1,2-dipropoxybenzene, 1,2-dibutoxybenzene,
1,2-dimethoxynaphthalene, 1,2-diethoxynaphthalene,
1,2-dimethoxyanthracene, 1,2-diethoxyanthracene,
2,3-dimethoxytoluene, 3,4-dimethoxystyrene,
1,2-dimethoxy-4-propenylbenzene, 1,3-benzodioxole,
1,4-benzodioxane, 1,3-dioxolane, 1,4-dioxane,
1,2-dimethoxypropane, 1-t-butoxy-2-ethoxyethane,
1-t-butoxy-2-methoxyethane, 1,2-diethoxyethane,
1,2-dimethoxyethane, 1,2-dibutoxyethane,
1,2-dipropoxyethane, 1,2-diisopropoxyethane and methyl tetrahydrofurfuryl ether.

The following deactivation compounds have been found to be extremely effective in controllably deactivating the Ziegler-Natta polymerization catalyst: 1,2 dimethoxybenzene and 1,2 dimethoxyethane.

The amount of deactivating compound employed depends on the type of catalyst system employed. In general the deactivating compound is employed in an amount of about 0.01 moles to about 10 moles per mole of transition metal catalyst preferably about 0.01 to about 5 moles per mole of transition metal catalyst.

In general, these compounds can be prepared by conventional techniques and are commercially available.

The deactivating compound can be introduced into the reaction system by a variety of well known techniques. The catalyst used in the gas phase polymerization processes may be combined with the deactivating compounds in sufficient amount to control catalyst activity and reduce hot-spots. This may be effected by mixing a finely divided deactivation compound with the catalyst employed in the gas phase polymerization process or by dissolving the deactivating compound in a solvent such as hexane and the like, combining it with the gas phase polymerization catalyst followed by removing the solvent from the catalyst that has been treated. Any drying process known in the art such as spray drying or evaporative drying employing a vacuum or drying at elevated temperatures or any combination of these conditions may be employed to effect solvent removal. Agglomeration of catalyst particles may be avoided by using dilute solutions of the deactivating compound e.g., anywhere from about 1% to about 20% and especially from about 2% to about 10% of deactivating compound in solvent. In addition to or as an alternative to combining the deactivating compound with the gas phase polymerization catalyst, the deactivating compound may be directly injected into the gas phase polymerization reactor during the polymerization reaction or intermittently in order to control the formation of hot-spots.

In the case of fluidized bed operation, a preferred technique and one which has numerous advantages is to introduce the deactivating agents into the reactor system upstream of the cooler as disclosed in U.S. Pat. No. 5,037,905 wherein PEEB is the deactivating agent. Addition of the deactivating agent of the instant invention in this manner Provides dramatic relief from fouling.

As mentioned previously the olefin polymerization e.g. ethylene polymerization or copolymerization can also be conducted in solution or slurry as described e.g., in Stille, Introduction to Polymer Chemistry, Wiley and Sons, N.Y. 1962.

For slurry or solution operation it is preferred that the deactivating compound be directly injected into the reactor during the polymerization to terminate the reaction.

The following Examples will illustrate the present invention.

In the Examples and Tables the following terms shall have the following meaning:

1. D.R. = Deactivating Reagent (1,2 diethers)
2. D.R./V = mole ratio of D.R. to vanadium
3. 1,2-DMB = 1,2 dimethoxybenzene
4. 1,2-DME = 1,2-dimethoxyethane
5. 1,3-DMB = 1,3-dimethoxybenzene
6. 1,4-DMB TM 1,4-dimethoxybenzene
7. 2,5-DMTHF TM 2,5-dimethoxytetrahydrofuran
8. PEEB = para-ethylethoxbenzoate
9. % Change = the difference in activity between control examples without deactivating reagents or oxygen containing compound and examples with deactivating reagents or oxygen containing compounds.

The activity of the catalyst was measured in grams of polyethylene per millimole of vanadium or titanium per hour per 100 psi of ethylene.

EXAMPLE 1

A vanadium based catalyst was prepared according to the procedure described in U.S. Pat. No. No. 4,508,842. The supported vanadium based catalyst was typically prepared as follows: silica gel was preactivated at a temperature in the range of about 250° C. to about 800° C. under a dry, inert gas such as nitrogen for 16 hours to give a support essentially free of adsorbed water and containing less than about 0.7 millimole per gram of silica of surface hydroxy groups. The silica was slurried in freshly distilled tetrahydrofuran (THF), under nitrogen. Vanadium trichloride (VCl3) was added to give a loading of about 0.2 to 0.7 millimole of vanadium per gram of support. The mixture was stirred for about 1 hour, then excess THF was removed.

Diethylaluminum chloride (DEAC) modification was effected by adding DEAC after excess THF is removed. The DEAC modification was conducted in anhydrous hexane or isopentane. After addition of DEAC was complete, the mixture was heated at a temperature of about 50° C. for about 6 hours under a purge of dry nitrogen to produce a dry, free-flowing powder.

EXAMPLE 2

A titanium based catalyst was prepared according to the procedure disclosed in U.S. Pat. No. 4,302,565. The supported titanium based catalyst was prepared as follows: magnesium chloride/titanium chloride/THF complex was impregnated into a triethylaluminum (TEAL) treated silica support from a solution of THF. The silica was first dried at 600° C. to remove water and most of the surface silanols, and chemically treated with TEAL to further passivate the remaining silanols. The dried free flowing precursor was then further reduced with the modifiers, DEAC and tri-n-hexylaluminum (TNHAL), in isopentane and dried.

EXAMPLES 3-10

These examples illustrate the deactivating properties of the 1,2-diethers of the present invention with respect to a vanadium catalyst in a slurry polymerization technique.

A solid catalyst, prepared as described in Example 1 was employed together with an alkyaluminum compound such as triisobutylaluminum (TIBA), as cocatalyst, a halohydrocarbon compound such as $CHCl_3$, as promoter. Various 1,2-diether compounds of the present invention were used to polymerize ethylene, with or without 1-hexene, in a one liter autoclave reactor. In each polymerization, the catalyst, the cocatalyst, the promoter, the 1,2-diether compound and the optional 1-hexene were premixed in a 8-ounce bottle containing 100 ml of hexane before transferred to the reactor. An amount of catalyst sufficient to give a charge of 0.03 millimole of vanadium was used. Forty equivalents each of cocatalyst and promoter were used per equivalent of vanadium. Anhydrous conditions were maintained at all time.

The polymerization reactor was dried by heating at 96° C. under a stream of nitrogen for 40 minutes. After cooling the reactor to 50° C., 500 ml of hexane was added to the reactor, and the reactor contents were stirred under a gentle flow of nitrogen. The premixed components were then transferred to the reactor under a stream of nitrogen and the reactor was sealed. The temperature of the reactor was gradually raised to 60° C. and the reactor was pressurized with 2 psi of hydrogen. The temperature was then raised to 75° C. and the reactor was pressured to 150 psi with ethylene. Heating was continued until the desired polymerization temperature of 85° C. was obtained. Polymerization was allowed to continue for 30 minutes, during which time ethylene was continually added to the reactor to maintain the pressure constant. At the end of 30 minutes, the reactor was vented and opened.

Table I sets forth the variables and the results of these polymerizations.

COMPARATIVE EXAMPLES 11-14

For comparative purposes, ethylene was polymerized as in Examples 3-10 except that no 1,2-diether compound or other oxygen-containing compound was used. The details of these polymerizations are set forth in Table I along with the details of Examples 3-10.

COMPARATIVE EXAMPLES 15-22

For comparative purposes, ethylene was polymerized as Examples 3-10 except that 1,2-diether compounds were replaced by other oxygen-containing compounds. The details of these polymerizations are set forth in Table I along with the details of Examples 3-10 and Comparative Examples 11-14.

TABLE I

| Example | D.R. | D.R./V | Cocat. | 1-Hexene (ml) | Activity | % Change |
|---|---|---|---|---|---|---|
| 11 | — | — | TEAL | 20 | 4380 | — |
| 3 | 1,2-DMB | 0.5 | TEAL | 20 | 526 | −88 |
| 4 | 1,2-DMB | 1.0 | TEAL | 20 | 475 | −89 |
| 12 | — | — | TEAL | 0 | 2825 | — |
| 5 | 1,2-DMB | 1.0 | TEAL | 0 | 527 | −81 |
| 13 | — | — | TIBA | 20 | 6299 | — |
| 6 | 1,2-DMB | 1.0 | TIBA | 20 | 366 | −94 |
| 14 | — | — | TIBA | 0 | 3698 | — |
| 7 | 1,2-DMB | 1.0 | TIBA | 0 | 610 | −84 |
| 8 | 1,2-DME | 0.5 | TEAL | 20 | 1627 | −63 |
| 9 | 1,2-DME | 1.0 | TEAL | 20 | 717 | −84 |
| 10 | 1,2-DME | 1.0 | TIBA | 20 | 904 | −85 |
| 15 | 1,3-DMB | 1.0 | TEAL | 20 | 4154 | −5 |
| 16 | 1,3-DMB | 1.0 | TIBA | 20 | 5579 | −11 |
| 17 | 1,4-DMB | 1.0 | TEAL | 20 | 4086 | −7 |
| 18 | 1,4-DMB | 1.0 | TIBA | 20 | 5707 | −9 |
| 19 | 2,5-DMTHF | 1.0 | TEAL | 20 | 4477 | 0 |
| 20 | THF | 1.0 | TEAL | 20 | 4609 | 5 |
| 21 | anisole | 1.0 | TEAL | 20 | 5015 | 16 |

TABLE I-continued

| Example | D.R. | D.R./V | Cocat. | 1-Hexene (ml) | Activity | % Change |
|---|---|---|---|---|---|---|
| 22 | PEEB | 10.0 | TEAL | 20 | 5204 | 19 |

EXAMPLES 23-24

A similar polymerization procedure as in Examples 3-10 was employed except that (1) a titanium catalyst (prepared according to Example 2) was used instead of a vanadium catalyst and (2) no halocarbon was employed as a promoter for the polymerization. An amount of catalyst sufficient to give a charge of 0.03 millimole of titanium was used. Forty equivalents of TEAL per equivalent of titanium were used as cocatalyst. The details of these polymerizations are set forth in Table II along with the details of Examples 25-29.

COMPARATIVE EXAMPLE 25

For comparative purposes, ethylene was polymerized as in Examples 23-24 except neither 1,2-diether compound nor other oxygen-containing compound was used. The details of this polymerization are set forth in Table II along with the details of Examples 23-24.

COMPARATIVE EXAMPLES 26-29

For comparative purposes, ethylene was polymerized as in Examples 23-24 except 1,2-diether compounds were replaced with other oxygen-containing compounds. The details of these polymerizations are set forth in Table II along with the details of Examples 23-24 and Comparative Example 25.

TABLE II

| Example | D.R. | D.R./Ti | Activity | % Change |
|---|---|---|---|---|
| 25 | — | — | 4537 | — |
| 23 | 1,2-DMB | 1.0 | 962 | −78 |
| 24 | 1,2-DME | 1.0 | 475 | −90 |
| 26 | 1,3-DMB | 1.0 | 3074 | −32 |
| 27 | 1,4-DMB | 1.0 | 3733 | −18 |
| 28 | anisole | 1.0 | 4875 | 7 |
| 29 | THF | 1.0 | 4381 | 4 |

Gas Phase Polymerization

EXAMPLES 30-32

A solid catalyst component prepared as described in Example 1 was employed together with an alkylaluminum compound (TEAL), as cocatalyst, and a halocarbon compound ($CHCl_3$), as promoter, to terpolymerize ethylene, 1-butene and 1-hexane in a fluid bed reactor system similar to that described and illustrated in U.S. Pat. Nos. 4,302,565, 4,302,566 and 4,303,771. In each polymerization, the solid catalyst component was continually fed to the reactor along with the TEAL cocatalyst and $CHCl_3$ promoter. The 1,2-diether deactivating compound as a diluted isopentane solution was continually fed to the cycle gas line upstream from the heat exchanger. Hydrogen was added to the reactor as a chain transfer reagent to regulate the molecular weight of the polymer produced. A small amount of nitrogen was also present.

Table III sets forth the details involving the composition of the catalysts used, the reaction conditions employed, the properties of the polymers produced and the productivity (based on vanadium in resin, parts per million) of each catalyst system. In addition, the results of fouling are indicated.

COMPARATIVE EXAMPLE 33

For comparative purposes, ethylene was terpolymerized with 1-butene and 1-hexene as in Examples 30-32 except that no 1,2-diether deactivating compound was employed. The details of this polymerization are set forth in Table III along with the details of Examples 30-32.

TABLE III

| Example | 33 | 30 | 31 | 32 |
|---|---|---|---|---|
| Catalyst | $VCl_3$/THF | $VCl_3$/THF | $VCl_3$/THF | $VCl_3$/THF |
| Support | $SiO_2$ | $SiO_2$ | $SiO_2$ | $SiO_2$ |
| Modifier | DEAC | DEAC | DEAC | DEAC |
| Modifier/V (molar ratio) | 3 | 3 | 3 | 3 |
| Cocatalyst | TEAL | TEAL | TEAL | TEAL |
| Al/V (molar ratio) | 35 | 35 | 35 | 35 |
| Promoter | $CHCl_3$ | $CHCl_3$ | $CHCl_3$ | $CHCl_3$ |
| Promoter/V (molar ratio) | 35 | 35 | 35 | 35 |
| 1,2-DMB/V (molar ratio) | 0 | 0.05 | 0.1 | 0.5 |
| Reaction Conditions | | | | |
| Temp (°C.) | 70 | 70 | 70 | 70 |
| Total Pressure (psi) | 300 | 300 | 300 | 300 |
| $C_2H_4$ Pressure (psi) | 140 | 140 | 140 | 140 |
| 1-hexene/$C_2H_4$ (molar ratio) | 0.027 | 0.027 | 0.027 | 0.027 |
| 1-butene/$C_2H_4$ (molar ratio) | 0.08 | 0.08 | 0.08 | 0.08 |
| $H_2$/$C_2H_4$ (molar ratio) | 0.013 | 0.013 | 0.013 | 0.013 |
| Residence time (hour) | 4 | 4 | 4 | |
| Polymer Properties | | | | |
| Density (g/ml) | 0.9160 | 0.9113 | 0.9095 | N.M. |
| MI | 0.141 | 0.183 | 0.437 | N.M. |
| FI | 9.86 | 11.6 | 23.8 | N.M. |
| MFR | 70 | 63 | 54 | N.M. |
| Productivity | | | | |
| Vanadium ash (ppm) | 7.5 | 9.0 | 11.5 | >18 |
| Reactor system fouling | s* | none | none | — |

MI = Melt Index (ASTM D-1238, Condition E)
FI = Flow Index (ASTM D-1238, Condition F)
MFR = Melt Flow Ratio: FI/MI
N.M. = not measured
s* = significant As will be discerned from an analysis of the foregoing examples, 1,2 diethers are very effective deactivating agents for olefin polymerization employing Ziegler-Natta catalyst systems. Moreover, the deactivating compounds can be employed in very small amounts without causing harm to the products. Advantageously, it will be seen that the deactivating agent is extremely effective for permitting operation with little or no reactor system fouling.

What is claimed is:

1. A method for deactivating a Ziegler-Natta transition element catalyst employed in olefin polymerization reactions, which comprises contacting said catalyst with a compound represented by the formula:

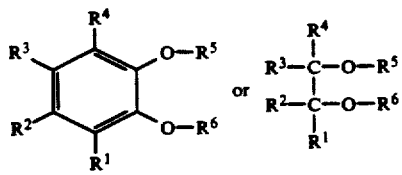

wherein $R^1$, $R^2$, $R^3$, and $R^4$ are the same or different and are H, linear or branched alkyl radicals having from 1-20 carbon atoms, cycloalkyl, aryl, arylalkyl, which with the exception of H, can combine to form rings of cyclic alkyl or benzene; $R^5$ and $R^6$ has the same meaning as $R^1$, $R^2$, $R^3$, and $R^4$ except for hydrogen, $R^5$ or $R^6$ can combine with $R^1$, $R^2$, $R^3$, and $R^4$ to form a cyclic alkyl containing an oxygen atom, $R^5$ and $R^6$ can also combine to form a divalent hydrocarbon radical containing from 1-20 carbon atoms, said compound being present in an amount sufficient to controllably deactivate said olefin polymerization catalyst.

2. A method according to claim 1 wherein $R^1$, $R^2$, $R^3$, and $R^4$ is H, an alkyl group having 1-6 carbon atoms, cycloalkyl having 3 to 6 carbon atoms, aryl having 6 to 14 carbon atoms;

$R^5$ and $R^6$ can have the same meaning as $R^1$, $R^2$, $R^3$, and $R^4$ except for H.

3. A method according to claim 1 wherein said deactivating compound is 1,2-dimethoxybenzene.

4. A method according to claim 1 wherein said deactivating compound is 1,2-dimethoxyethane.

5. A method according to claim 1 wherein said catalyst comprises a Ziegler-Natta catalyst based on a transition element selected from the group consisting of Ti, V, Cr and Zr.

6. A method according to claim 1 wherein said catalyst is a vanadium based catalyst.

7. A method according to claim 1 wherein said catalyst is a titanium based catalyst.

8. A method according to claim 1 wherein said deactivating compound is employed in an amount of about 0.01 moles to about 10 moles per mole of said transition element catalyst.

9. A method according to claim 1 wherein said deactivating compound is employed in an amount of about 0.01 moles to about 5 moles per mole of said transition element catalyst.

10. A method according to claim 1 wherein said olefin comprises ethylene.

11. A method according to claim 1 wherein said olefin polymerization is conducted in a fluidized bed reaction system and wherein said deactivating compound is introduced to the recycle line of the reaction system.

12. A method according to claim 18 wherein said deactivating compound is 1,2-dimethoxybenzene.

13. A method according to claim 18 wherein said deactivating compound is 1,2-dimethoxyethane.

14. A method according to claim 18 wherein said deactivating compound is employed in an amount of about 0.01 moles to about 10 moles per mole of said transition element catalyst.

15. A method according to claim 18 wherein said deactivating compound is employed in an amount of about 0.01 moles to about 5 moles per mole of said transition element catalyst.

16. A method for deactivating a Ziegler-Natta transition element catalyst employed in olefin polymerization reactions, said catalyst being based on a transition element selected from the group consisting of Ti, V, Cr, and Zr, which comprises contacting said catalyst with a compound represented by the formula:

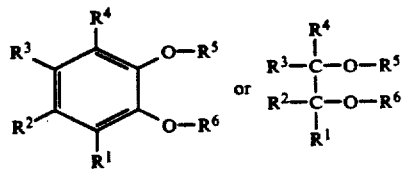

wherein $R^1$, $R^2$, $R^3$, and $R^4$ is H, an alkyl group having 1-6 carbon atoms, cycloalkyl having 3 to 6 carbon atoms, aryl having 6 to 14 carbon atoms;

$R^5$ and $R^6$ can have the same meaning as $R^1$, $R^2$, $R^3$, and $R^4$ except for H said compounds being present in an amount of about 0.01 moles to about 10 moles per mole of said transition element catalyst.

17. A method according to claim 16 wherein said deactivating compound is 1,2-dimethoxybenzene.

18. A method according to claim 16 wherein said deactivating compound is 1,2-dimethoxyethane.

19. A method according to claim 19 wherein said deactivating compound is employed in an amount of about 0.01 moles to about 5 moles per mole of said transition element catalyst.

20. A method according to claim 11 wherein said catalyst is a vanadium based catalyst.

21. A method according to claim 11 wherein said catalyst is a titanium based catalyst.

22. A method according to claim 11 wherein said olefin comprises ethylene.

* * * * *

UNITED STATES PATENT AND TRADEMARK OFFICE
CERTIFICATE OF CORRECTION

PATENT NO. : 5,200,502
DATED : April 6, 1993
INVENTOR(S) : Kao et al

It is certified that error appears in the above-identified patent and that said Letters Patent is hereby corrected as shown below:

Column 10, lines 3, 5, 7, and 11, change "18" to --11--;

line 41, change "19" to --16--; and lines 45, 47, and 49, change "11" to --16--.

Signed and Sealed this

Tenth Day of January, 1995

*Attest:*

BRUCE LEHMAN

*Attesting Officer*   *Commissioner of Patents and Trademarks*